United States Patent
Atwater et al.

(10) Patent No.: US 6,908,254 B2
(45) Date of Patent: Jun. 21, 2005

(54) CAM NUT ADJUSTMENT APPARATUS AND METHOD

(75) Inventors: Phillip E. Atwater, Howell, MI (US); Ronald Douglas North, West Bloomfield, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/673,460

(22) Filed: Sep. 30, 2003

(65) Prior Publication Data

US 2005/0069382 A1 Mar. 31, 2005

(51) Int. Cl.[7] ................................................. F16D 1/00
(52) U.S. Cl. ........................ 403/350; 411/973; 411/169
(58) Field of Search ................................. 411/169, 973, 411/354, 539; 403/408.1, 350, 351, 352

(56) References Cited

U.S. PATENT DOCUMENTS

| 4,266,591 | A | * | 5/1981 | F'Geppert | 411/167 |
| 4,428,544 | A | * | 1/1984 | Councilman | 411/517 X |
| 5,580,201 | A | * | 12/1996 | Brilmyer | 411/354 |

* cited by examiner

*Primary Examiner*—John Cottingham
(74) *Attorney, Agent, or Firm*—Baker & Hostetler LLP

(57) ABSTRACT

An adjustment apparatus and method includes a sliding member and a cam for directing longitudinal movement of the sliding member relative to a stationary member. Assembly, adjustment, and tightening of the sliding member onto a stationary member can be achieved with access to a single face of the adjustment apparatus.

18 Claims, 4 Drawing Sheets

CAM NUT ADJUSTMENT APPARATUS AND METHOD

FIELD OF THE INVENTION

The present invention relates generally to nut-and-bolt-type fasteners and adjustment methods. More particularly, the present invention relates to an assembly that can be rotated to dictate movement perpendicular to its axis of rotation and be securely fastened.

BACKGROUND OF THE INVENTION

Often times in assemblies where two parts are mounted adjacent to each other, adjustment of one part relative to the other is required. In some of these situations, access to one or more of the parts may be limited as one or more of the faces of the parts may be blocked, making adjustment difficult or impossible. The number and size of tools necessary for making an adjustment can also add constraints and difficulty. In such situations, therefore, it can be preferable to provide a system and method of adjustment that does not require access to multiple areas, and even more preferable, to provide a system and method of adjustment that only requires access to one location.

In one example, toe angle adjustments are often necessary during the installation and maintenance of alignment in rear wheel suspension systems of motor vehicles. The current designs or mechanism for such alignment requires access to two sides of the joint, i.e., where the suspension meets the vehicle frame, to facilitate adjusting and tightening. However, such access is cumbersome and time consuming.

Accordingly, it is desirable to provide an adjustment method that can allow for assembly, adjustment, and tightening to be made from one side of the joint. It is also preferable to provide an adjustment method whereby the effect of the adjustment is readily visible or can be coupled to an electronic readout, which shows the toe angle of the wheel being adjusted.

In some instances, it can be further desirable to provide an adjustment method that can be tightened quickly and securely with a single tool.

SUMMARY OF THE INVENTION

The foregoing needs are met, to a great extent, by the present invention, wherein in one embodiment a cam assembly is provided for mounting on a stationary member that comprises a sliding member, having a first slot defined therethrough, a cam, a first fastener that extends through said first slot in said sliding member to said stationary member, wherein said cam is operably coupled to said sliding member to direct longitudinal movement along said stationary member when said cam is rotated. The cam assembly may incorporate a sliding member that further includes a face slot defined thereon to retain said cam and may also comprise a second slot defined through the sliding member. Some embodiments of the instant invention may incorporate two slots defined through the sliding member and two fasteners that extend through the sliding member to the stationary member. In embodiments where the fastener has a head, the head configuration may include a hex, six-point, eight-point, ten-point, twelve-point or torx configurations. The stationary member may be fitted with threads that mate with threads of the fastener or attached to nuts comprising threads for fastening the fastener.

In accordance with another embodiment, a method for making a position adjustment between a sliding member and a stationary member is provided that comprises rotating a cam, sliding a sliding member, and tightening a first fastener that extends through said first slot in said sliding member to said stationary member, wherein said cam is operably coupled to said sliding member to direct longitudinal movement along said stationary member when said cam is rotated. The method may incorporate a sliding member that further includes a face slot defined thereon to retain said cam and may also comprise a second slot defined through the sliding member. Some embodiments of the instant invention may incorporate two slots defined through the sliding member and two fasteners that extend through the sliding member to the stationary member. In embodiments where the fastener has a head, the head configuration may include a hex, six-point, eight-point, ten-point, twelve-point or torx configurations. The stationary member may be fitted with threads that mate with threads of the fastener or attached to nuts comprising threads for fastening the fastener.

In accordance with yet another embodiment of the present invention, a means for making a position adjustment between a sliding member and a stationary member is provided that comprises a sliding means, a camming means, and a first fastening means for fastening the cam means through a through slot in the sliding means onto the stationary member, wherein the cam means is operably coupled to the sliding means to direct longitudinal movement along the stationary member. The adjustment means may incorporate a sliding means that further includes a face slot defined thereon to retain said camming means and may also comprise a second slot defined through the sliding means. Some embodiments of the instant invention may incorporate two slots defined through the sliding means and two fasteners that extend through the sliding means to the stationary member. In embodiments where the fastening means has a head, the head configuration may include a hex; six-point, eight-point, ten-point, twelve-point or torx configurations. The stationary member may be fitted with threads that mate with threads of the fastening means or attached to nuts comprising threads for fastening the fastening means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
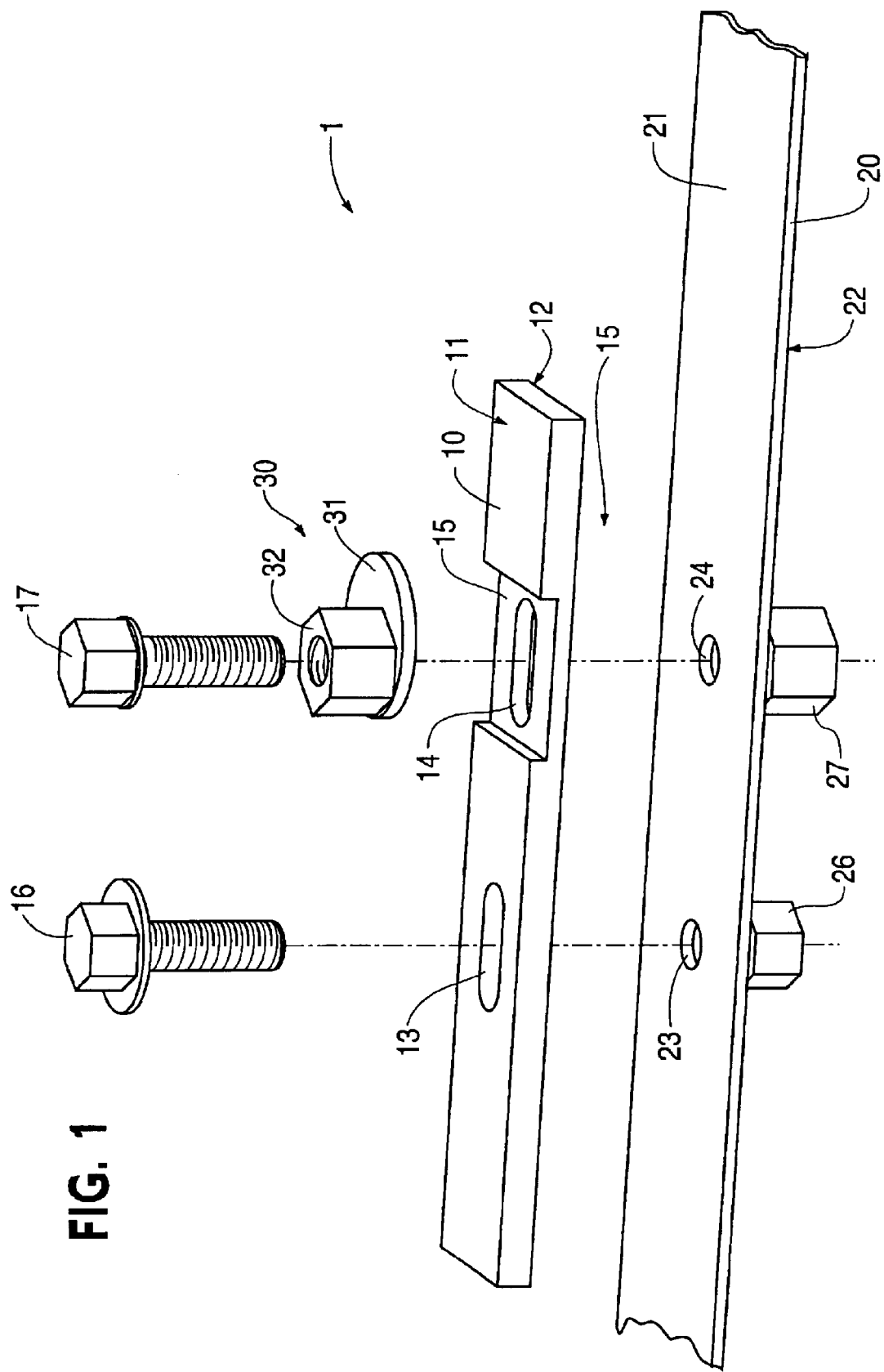
FIG. 1 is an exploded view illustrating a cam assembly according to one embodiment of the invention.
Figure 2:
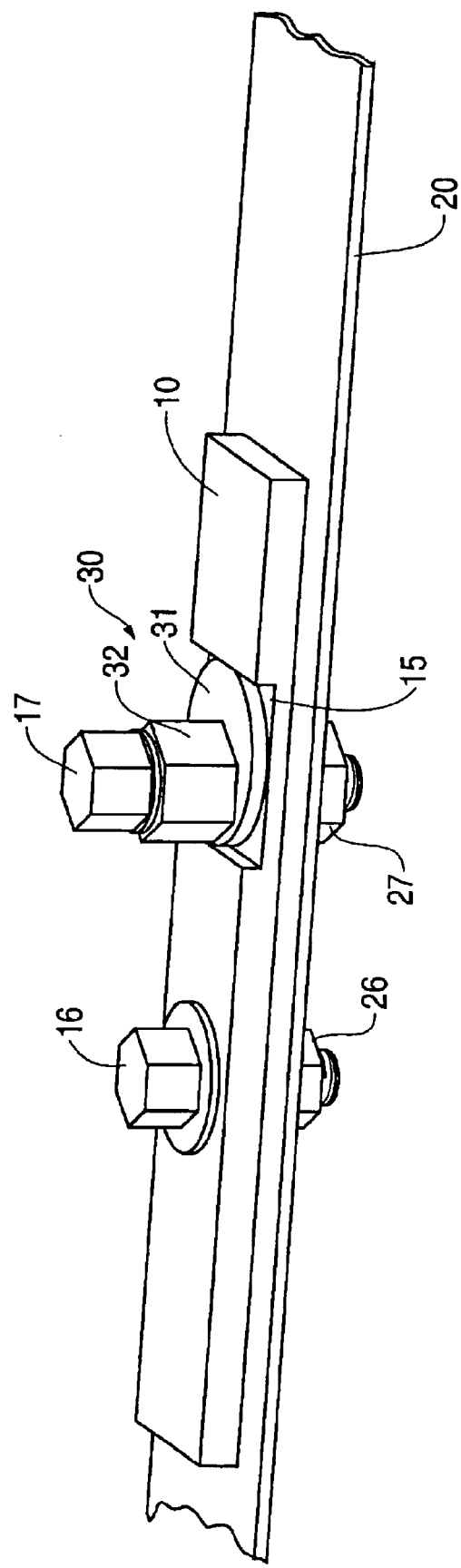
FIG. 2 is a perspective view of a cam assembly according to one embodiment of the invention.

The invention will now be described with reference to the drawing figures, in which like reference numerals refer to like parts throughout. An embodiment in accordance with the present invention provides a system and method for making a position adjustment between two mechanical parts, and locking them into position. FIGS. 1 and 2 depict a cam assembly 1 in accordance with one embodiment of the instant invention. The assembly 1 comprises a sliding member 10 and a stationary member 20.

The stationary member 20 need not be an extended member as shown, but could be a portion of a larger structure. For example, in some embodiments (see FIG. 4.), the stationary member 20 may be the frame or structure of a vehicle, or a part fitted to the vehicle frame. The sliding member 20 may be a suspension component. For example, in one embodiment, the cam assembly 1 may be incorporated as an adjustment mechanism designed to allow a toe angle adjustment to be made in the suspension of a vehicle.

It should also be appreciated by one of ordinary skill in the art, the term "stationary" is defined relatively herein, in that the stationary member 20 could not only be "stationary" relative to the sliding member 10, but that the sliding member 10 could also be held "stationary" relative to the stationary member 20. In the latter case in other words, the sliding member 10 becomes a stationary member and the stationary member 20 becomes a sliding member.

The sliding member 10 has a top face 11 and a bottom face 12. The bottom face 12 of the sliding member 10 rests on a top face 21 of the stationary member 20 creating an interface 15. The bottom face 12 of the sliding member 10 is preferably a smooth surface to allow for longitudinal movement along the top face 21 when in physical contact with each other and physical force is applied thereto.

The sliding member 10 comprises two through slots 13 and 14. The through slots 13 and 14 are preferably spaced on the sliding member 10 so that the center of the through slots 13 and 14 align with the center of holes 23 and 24 in the stationary member 20, respectively. The through slots 13 and 14 are preferably oblong in shape as is shown and are wide enough to accommodate the outer, diameter, of fasteners 16 and 17. Preferably, the width of the through slots 13 and 14 will be only slightly above the diameter of their respective fasteners 16 and 17, but larger widths are acceptable and are contemplated for some embodiments. In some embodiments, greater than two slots may also be incorporated.

The sliding member 10 also comprises a face slot 15. The face slot 15 is positioned over one of the through slots 13 and 14. The face slot 15 is carved into the sliding member 10 and has a length and width to clear a cam 30. In the embodiment shown in FIG. 1, the width of the face slot 15 spans the width of the sliding member 10. However, in some embodiments, the width necessary to clear the cam 30 may be less than the width of the sliding member 10. In such cases, the width of the face slot 15 need not span the entire width of the sliding member 10.

The depth of the face slot 15 in the sliding member 10 may be variable. However, the face slot 15 should be deep enough to retain the cam 30 but not so deep as to compromise the mechanical integrity of the sliding member 10. In other words, introduction of the face slot 15 should preferably not introduce appreciable flexibility in the sliding member 10.

In some embodiments, as shown, the face slot 15 can have a width equal to the diameter of the cam 30. The cam 30 comprises a washer 31 and an integral hex 32. In addition to a hex configuration, various commercially available nut head configurations, such as six-point, eight-point, ten-point, twelve-point and torx heads are available and could be incorporated into the present invention. More generally, any fasteners that can be formed having a drive head that will match a given socket or box-wrench-tool configuration may be used. The hex 32 and washer 31 are preferably a single unit, and may be originally separate entities that are forged or welded together to form the single cam washer 30 unit.

As is best shown in FIG. 1, the center axis of hex 32 is offset from the center axis of the washer 31. As will become evident from the teachings herein, the offset orientation of the washer 31 with respect to the hex 32 will provide the cam function of the cam assembly 1.

The sliding member 10 and the cam 30 are affixed to the stationary member 20 by the fasteners 16 and 17. The fasteners 16 and 17 may be any variation of a rod or pin for fastening objects together that usually has a head at one end and a screw thread at the other, including, example, bolts and screws. In some embodiments, the head of the fasteners 16 and 17 may be of the hex configuration, however, any commercially available nut head configuration, such as six-point, eight-point, ten-point, twelve-point and torx heads may also be included. More generally, any fasteners that can be formed having a drive head that will match a given socket or box-wrench-tool configuration may be used.

Figure 3:
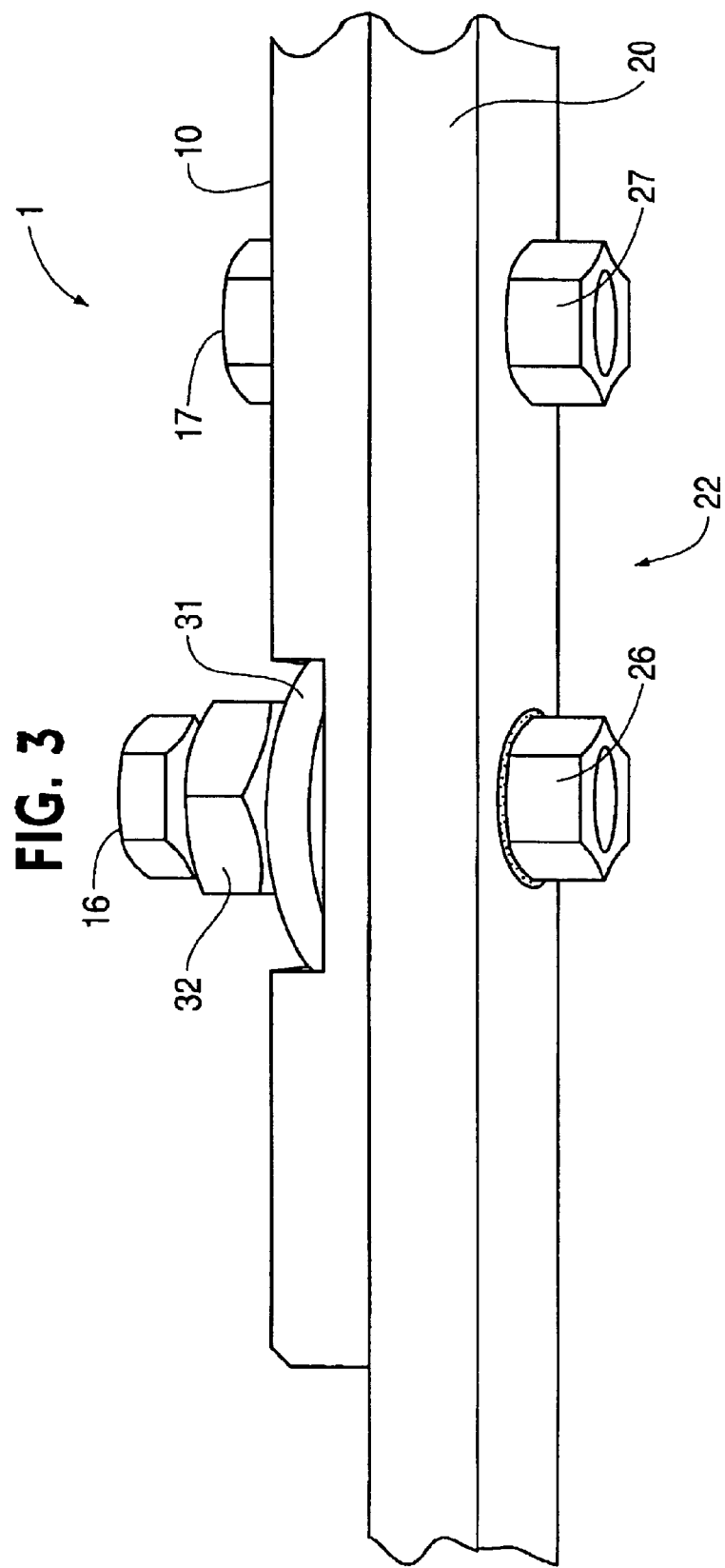
FIG. 3 is a bottom perspective view of a cam assembly according to one embodiment of the invention.

The fasteners 16 and 17 are screwed into the threads provided by nuts 26 and 27 positioned under holes 23 and 24, respectively, on the bottom face 22 of the stationary member 20. As best shown in FIG. 3, the threads for screwing the fasteners 16 and 17 may be provided by means of the nuts 26 and 27. In the embodiment shown, the nuts 26 and 27 are forged or welded onto the bottom face 21 of the stationary member 20. Secure attachment and immobilization of the nuts 26 and 27 to the bottom face 21 allows for tightening of the fasteners 16 and 17 without access to the bottom face 22 to otherwise immobilize nuts 26 and 27 while tightening.

In some embodiments, the threads for the fasteners 16 and 17 are provided by the stationary member 20. For example, in some embodiments stationary member 20 is sufficiently thick to allow threading to be incorporated into holes 23 and 24. In such an embodiment, the addition of the nuts 26 and 27 to the bottom face 22 may not be required.

The cam assembly 1 allows the adjustment of the sliding member 10 relative to the longitudinal axis of the stationary member 20 by rotating cam 30. In other words, rotational movement about the cam 30 can direct linear movement along the longitudinal axis of sliding member 10.

Accordingly, the length of the through slots 13 and 14 should minimally extend the length of lateral movement of sliding member 10 along stationary member 20 in response to rotation about the cam 30. Longer lengths are acceptable and can be designed into some embodiments. Shorter lengths, while acceptable, may limit the full range of movement afforded by cam 30. The range of lateral movement of the sliding member 20 can be dictated by two factors: (1) the diameter of the cam washer 31 and (2) the degree to which the hex 32 is offset from the center axis of the washer 31. These two factors can be used to determine the distance the distal edge of the washer 31 can travel and thereby determine the distance the face slot 15 and the sliding member 10 can move.

In one example of the operation of the instant cam assembly 1, the cam assembly 1 is clamped to a stationary member 20 as best shown in FIG. 2. In order to make an adjustment to the position of the sliding member 10 relative to the stationary member 20, an operator can first loosen, but not necessarily remove, the bolt 16. The operator then similarly loosens, but not remove, the bolt 17. Once the fasteners 16 and 17 have been loosened, the sliding member 10 is free to move longitudinally in response to rotational movement about the cam 30 axis. After the cam 30 is rotated to move the sliding member 20 to a desired position along the stationary member 20, the fastener 16 is tightened to clamp and immobilize the sliding member 10 relative to the stationary member 20. The operator can then additionally fasten the fastener 17 to further lock down the cam 30 and the sliding member 10.

Figure 4:
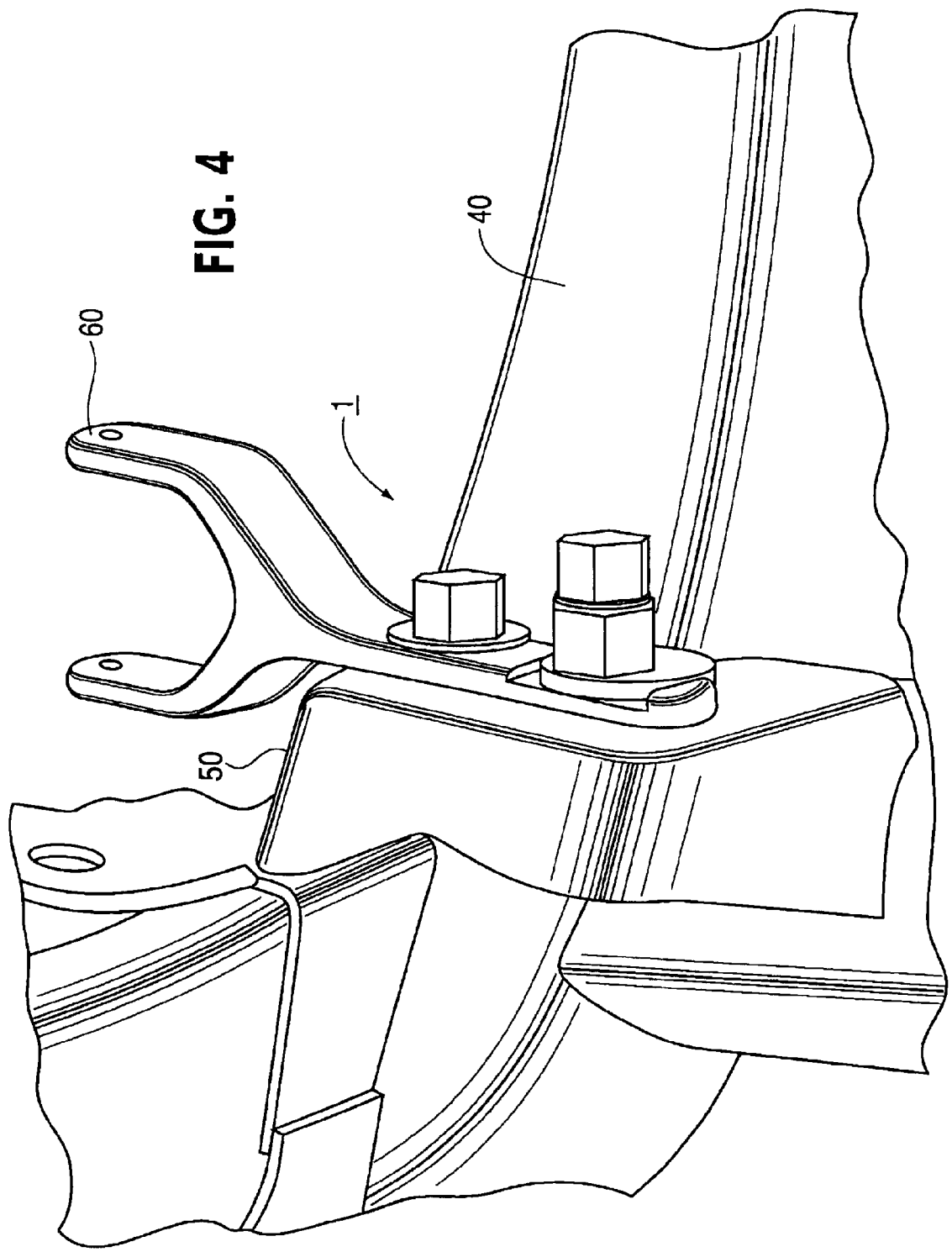
FIG. 4 is a perspective view of a cam assembly on a rear cross member assembly of an automobile according to one embodiment of the invention.

In one particular application of one embodiment of the instant invention, the cam assembly 1 is fitted for use in an automobile suspension (FIG. 4). For example, one embodiment can allow a toe angle adjustment to be made on the rear wheels of a vehicle fitted with the cam assembly 1. The cam assembly 1 may be fitted onto a multi-link rear suspension, however, multiple types of suspension systems are available in the art and can be used with the present invention. Additionally, the present invention should not be limited for use in rear assemblies only.

The cam assembly 1 as shown in FIG. 4 is mounted on a rear cross-member 40 assembly via a mount 50. A toe-link assembly is attached via a yoke 60 to the cam assembly which connects the rear cross-member assembly 40 to one of the rear wheels. The alignment of the toe-link with a rear wheel can accordingly be adjusted by adjusting the cam assembly 1. The design described herein permits such an adjustment to be made from the same side of the connection as the final tightening procedure without requiring access to both sides of the joint to facilitate adjusting and tightening.

The advantages of such an embodiment are that the cam assembly 1 can be assembled, adjusted, and tightened from one location. Also, it is possible to visually see what effect the adjustment has made and to watch any electronic readout, which shows the toe angle of that wheel. The sliding member 10 can be tightened quickly and securely, and can be adapted for adjustment and tightening with one tool.

The individual parts of the instant invention are relatively simple to produce and can be relatively easily manufactured from standard materials using standard manufacturing methods. The parts may comprise any material suitable for the particular application. For example, where durability and high strength are desired, the parts may comprise metals or metal alloys, including, but not limited to steel, iron, aluminum, silicon, and copper. In other embodiments, the parts may comprise plastics. Each of the parts of the cam assembly 1 need not all comprise of the same material, but may be used in combination. For example, a plastic cam 30 may be incorporated with a metal sliding member 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cam assembly for mounting on a stationary member, comprising:
    (a) a sliding member having a first slot defined therethrough;
    (b) a cam;
    (c) a first fastener that extends through said first slot in said sliding member to said stationary member; and
    a second fastener that extends through a second slot in said sliding member to said stationary member, wherein said cam is operably coupled to said sliding member to direct longitudinal movement along said stationary member when said cam is rotated.

2. The cam assembly according to claim 1, wherein said sliding member further has a face slot defined thereon to retain said cam.

3. The cam assembly according to claim 1, wherein the cam includes a washer and a nut.

4. A cam assembly for mounting on a stationary member, comprising:
    (a) a sliding member having a first slot defined therethrough;
    (b) a cam; and
    (c) a first fastener that extends through said first slot in said sliding member to said stationary member, wherein said cam is operably coupled to said sliding member to direct longitudinal movement along said stationary member when said cam is rotated and said first fastener and a second fastener comprise a head.

5. A cam assembly for mounting on a stationary member, comprising:
    (a) a sliding member having a first slot defined therethrough;
    (b) a cam; and
    (c) a first fastener that extends through said first slot in said sliding member to said stationary member, wherein said cam is operably coupled to said sliding member to direct longitudinal movement along said stationary member when said cam is rotated and said first fastener and a second fastener comprise a head, which has a configuration that is one of hex, six-point, eight-point, ten-point, twelve-point and torx configurations.

6. The cam assembly according to claim 1, wherein the stationary member is fitted with threads that mate with threads of the first and second fasteners.

7. The cam assembly according to claim 1, wherein the stationary member has nuts fitted with threads that mate with threads of the first and second fasteners.

8. The method according to claim 7, wherein said sliding member further has a face slot defined thereon to retain said cam.

9. The method according to claim 7, wherein the cam includes a washer and a nut.

10. A method of making a position adjustment between a sliding member and a stationary member, comprising:
    (a) rotating a cam;
    (b) sliding a sliding member having a first slot defined therethrough and a second fastener that extends through a second slot in said sliding member to said stationary member; and (c) tightening a first fastener that extends through said first slot in said sliding member to said stationary member, wherein said cam is operably coupled to said sliding member to direct longitudinal movement along said stationary member when said cam is rotated.

11. A method of making a position adjustment between a sliding member and a stationary member, comprising:

(a) rotating a cam;

(b) sliding a sliding member having a first slot defined therethrough; and (c) tightening a first fastener that extends through said first slot in said sliding member to said stationary member, wherein said cam is operably coupled to said sliding member to direct longitudinal movement along said stationary member when said cam is rotated and said first fastener and a second fastener comprise a head.

12. A method of making a position adjustment between a sliding member and a stationary member, comprising:

(a) rotating a cam;

(b) sliding a sliding member having a first slot defined therethrough; and (c) tightening a first fastener that extends through said first slot in said sliding member to said stationary member, wherein said cam is operably coupled to said sliding member to direct longitudinal movement along said stationary member when said cam is rotated and said first fastener and a second fastener comprise a head, which has a configuration that is one of hex, six-point, eight-point, ten-point, twelve-point and torx configurations.

13. The method according to claim 10, wherein the stationary member is fitted with threads that mate with threads of the first and second fasteners.

14. The method according to claim 10, wherein the stationary member has nuts fitted with threads that mate with threads of the first and second fasteners.

15. The apparatus according to claim 13, wherein said sliding means further has a face slot defined thereon to retain said camming means.

16. The apparatus according to claim 13, wherein the camming means includes a washer and a nut.

17. An apparatus for making a position adjustment between a sliding member and a stationary member, comprising:

(a) a sliding means having a first slot defined therethrough;

(b) a camming means;

(c) a first fastening means that extends through said first slot in said sliding means to said stationary member; and (d) a second fastening means that extends through a second slot in said sliding means to said stationary member, wherein said camming means is operably coupled to said sliding means to direct longitudinal movement along said stationary member when said camming means is rotated.

18. The apparatus according to claim 15, wherein the stationary means is fitted with threads that mate with threads of the first and second fastening means.

* * * * *